United States Patent [19]

Barton

[11] 3,953,191
[45] Apr. 27, 1976

[54] CUBED SOIL CONDITIONER WITH HIGH WATER ABSORPTIVITY AND RETENTIVITY

[75] Inventor: Benny M. Barton, Lubbock, Tex.
[73] Assignee: HoBar, Inc., O'Donnell, Tex.
[22] Filed: July 25, 1974
[21] Appl. No.: 491,927

[52] U.S. Cl. .................................. 71/23; 71/11; 71/64 SC; 71/64 JC
[51] Int. Cl.² .......................................... C05F 5/00
[58] Field of Search ................ 71/1, 11, 5, 23, 24, 71/25, 64 R, 64 C, 64 SC, 64 JC, 64 A

[56] References Cited
UNITED STATES PATENTS

| | | | |
|---|---|---|---|
| 2,005,365 | 6/1935 | Di Giacinto | 71/5 X |
| 2,974,030 | 3/1961 | Geary | 71/64 SC |
| 3,075,836 | 1/1963 | Jackson | 71/23 X |

OTHER PUBLICATIONS

Schisler, Stimulation of Yield in the Cultivated Mushroom, pp. 844–850, Applied Microbiology, July, 1967.

Primary Examiner—Charles N. Hart
Assistant Examiner—Ferris H. Lander
Attorney, Agent, or Firm—Berman, Aisenberg & Platt

[57] ABSTRACT

Pathogens and weed seeds contained in raw cotton gin waste are destroyed during cubing, which also imparts high water absorptivity to the resulting product. By incorporating fertilizer and/or soil activants with the raw cotton gin waste prior to cubing, a particularly advantageous fertilizer is obtained.

9 Claims, No Drawings

CUBED SOIL CONDITIONER WITH HIGH WATER ABSORPTIVITY AND RETENTIVITY

BACKGROUND OF THE INVENTION

The High Plains of Texas alone produce over 2,000,000 bales of cotton annually, each such bale representing about 500 pounds of lint, 860 pounds of seed and 640 pounds of waste material. The lint and seed are sold as commodities on the open market. This, however, leaves about 1.28 billion pounds of cotton gin waste in the form of burrs, leaves and twigs to be disposed of each year. The cotton gin waste is very high in organic matter, and farmers in this area have returned it to the field to use it as a soil conditioner.

Raw cotton gin waste is believed to be a carrier of pathogens, such as Verticillum Wilt, which are detrimental to woody or herbaceous dicotyledonous plants. Such waste also contains weed seeds which would be detrimental to, e.g., a home garden.

Burrs have been cubed and used as feed stuff for cattle. The cubing process itself is not a new procedure; it has been used in the feed industry for over forty years. Only recently, however, has this process been used in the cotton waste area.

SUMMARY OF THE INVENTION

Cotton gin waste has a high concentration of organic matter and is thus useful as a soil conditioner. Unfortunately, it often contains pathogens which are detrimental to woody or herbaceous dicotyledonous plants and weed seeds which are detrimental to home gardens. It is also relatively light and is thus subject to being blown away when attempts are made to apply it to and mix it in with soil.

By cubing an admixture of a) cotton gin waste and b) fertilizer and/or soil activant(s), a well-balanced high-organic-matter soil conditioner free from detrimental pathogens (disease) and weed seeds is obtained. In addition to the ease with which this soil conditioner can be handled and applied to soil, it is capable of absorbing three times its (dry) volume of water. The use of cubed cotton gin waste alone, i.e. without added fertilizer and/or adjuvant(s), provides most of these same advantages as a soil conditioner.

An object of this invention is thus to produce a practical and useful product from cotton gin waste. A further object is to provide a soil conditioner which is relatively easy to apply to soil and is not readily blown away from the locus of application. A still further object is to rid cotton gin waste of detrimental pathogens and weeds seeds. Another object is to impart a sufficient water absorbency to the soil conditioner so that it will be swollen by surface water and will inhibit evaporation of such water, once absorbed. Still further objects are apparent from the following description.

DETAILS

Cubing is a term of art which is applied to pelletizing. In context, the cubing process involves dusting, grinding, reducing, steaming, pressing and cooling of cotton gin waste. The gin waste is first blown through a large, e.g. a 42-inch, "tommy-type" cyclone (dusting) where the bulk of contained sand and dust is separated (blown out) from other components. The substance which is left is then conveyed to a hammer mill (e.g. a rotary type, such as 150 horsepower model VEE-ESS 1436, manufactured by Landers Manufacturing Company of Fort Worth, Tex.) in which it is chopped and ground as finely as possible. [This particular hammer mill is two and one-half feet in diameter with an 8-inch screen (made of one-fourth inch steel screen wire with one-fourth inch openings therebetween) completely encircling the hammer.] The hammer-milled product is then augered up (fed by a screw conveyor) to, e.g., six large cyclones wherein it is reblown (reduced) to assure maximum freedom from dust.

The virtually dust-free waste is then conveyed by blower to a chamber for steaming. The temperature of the steam (superheated) is approximately 215° F, and the steaming is effected by a constant pressure of 30 pounds per square inch gage (psig). [The concentration of the steam varies somewhat with the moisture content of the cgw. A manual control valve permits an operator to vary the amount of water introduced into the steam chamber from 0 to 2 gallons per hour. As the firmness of the extruded pellets is dependent upon moisture content, the manual valve is set at a level which results in good firm pellets. Different fields and different harvesting periods yield cgw which requires different amounts of added moisture.] The steamed waste is fed into a pellet die chamber wherein it is pressed through a cylindrically-shaped die.

The extruded waste is thus cylindrical in shape, rather than cubic, and ordinarily breaks off in pieces (pellets) of from one half to one and a half inches in length, but may also be longer. The length of such pellets is not in any way critical, but packaging could present some problem in the absence of the natural tendency of the pellets to break off in the noted relatively short lengths.

The pellets (or cubes) are then conveyed to a cooling chamber where they are cooled to about 80° F before being conveyed (augered or blown) to storage. The entire cubing process is accomplished with a cubing machine which is standard and recognized equipment, details of which are not the subject of this invention.

Although cotton gin waste which is cubed as described in the preceding paragraphs has fertilizing properties, is pathogen (disease) free (detrimental pathogens are destroyed during steaming and extruding), weed seed free (weed seeds destroyed by grinding and pressure) and also contains the desired absorptivity, its properties are materially enhanced by incorporation fertilizer and/or soil adjuvant(s) in the thus-cubed admixture. Such added components are admixed with steamed cotton gin waste just before the latter is pelletized (pressed through the clyindrical die). The amount of added fertilizer and/or soil adjuvant(s) is varied extensively, depending upon the actual condition of the soil which is to be treated. Thus, the precise proportions and the specific nature of particular fertilizer and/or soil adjuvant(s) incorporated in the soil conditioner are not critical to the broader aspect of this invention.

As fertilizer one or a combination of sources of nitrogen, phosphorus and/or potassium are employed. Such sources include, but are not limited to, urea, ammonium phosphate, ammonium nitrate, ammonium sulfate, calcium phosphate, potassium chloride, basic slag and such mixed fertilizers as ammonia plus superphosphate. Suitable sources of nitrogen, phosphorus and/or potassium as fertilizer components are well known and are not, per se, the essence of the subject invention. The soil conditioner advantageously contains (per 100 pounds) from about 0.35 to about 0.5 pound of available nitrogen, from about 0.13 to about 0.17 pound of available phosphorus and from about 0.13 to about 0.17 pound of available potassium.

Soil adjuvants include conditioners, stabilizers and, in fact, any material (exclusive of fertilizers) that is worked into soil to increase its productivity or to enhance the nature or size of crops produced therefrom. Exemplary are soluble calcium salts, e.g. calcium chloride and gypsum; acid and acid formers, e.g. sulfur, sulfuric acid, iron sulfate and aluminum sulfate; lime and limestone; and water-soluble high molecular-weight polymeric electrolytes, e.g. HPAN (modified hydrolyzed polyacrylonitrile), VAMA (modified vinyl acetate maleic acid and IBMA (isobutylene maleic acid copolymer). Adjuvants are used singly or in compatible combinations. The concentration of any particular adjuvant depends on soil condition, locale and crop, as is fully appreciated by the artisan. This invention is not directed to the presence or inclusion of any particular adjuvant. The broad aspect of the invention does not even require any adjuvant.

Illustrative fertilizers (based on the relative proportions of nitrogen, phosphorus and potassium) and the amounts thereof admixed with 100 pounds of cotton gin waste to produce the subject cubed soil conditioner are reflected in the following table.

mill at a rate of 160 pounds per minute. [The rate can be synchronized with the operation of a cotton gin and the cgw of the cotton being sinned.] Hammer-mill the cgw to obtain a product composed of particles with a major dimension of less than one-quarter inch.

Blow the thus-ground-particles through a 34-inch tommy-type cyclone into a drop-line pipe (which is approximately 10 inches in diameter and 10 feet in length) at a rate of about 160 pounds per minute and into a circular feeding trough (12 inches in diameter and 8 feet in length), which is directly above and parallel to a steam chamber. Convey the cgw with a 12-inch auger from one end of the trough to the other and through a drop hole therein through which it falls (gravitational force only) into the steam chamber [a circular "Landers Manufacturing Company" steam chamber (12 inches in diameter, 5 feet in length and containing a spiral auger which moves the cgw through the entire chamber and out the other end)], where it is subjected to steam maintained at 30 psig and a temperature in excess of 200° F (usually a consistent 215° F).

Transport the thus steamed cgw from the exit of the steam chambers via a 12-inch by 3-foot auger into a drop line into which plural augers feed. Each of these plural augers is connected to a source of fertilizer or soil adjuvant and is separately controlled (by conven-

| Fertilizer | Nitrogen (parts by wt.) | Phosphorus (parts by wt.) | Potassium (parts by wt.) | Nitrogen (pounds)* per 100 pounds of cotton gin waste | Fertilizer (pounds)** per 100 pounds of cotton gin waste |
|---|---|---|---|---|---|
| 1 | 17 | 0 | 0 | 0.4 | 2.0 to 2.5 |
| 2 | 21 | 0 | 0 | 0.5 | 2.5 to 3.5 |
| 3 | 15 | 5 | 5 | 0.35 | 3.0 to 4.0 |
| 4 | 10 | 5 | 5 | 0.40 | 3.5 to 4.5 |
| 5 | 18 | 0 | 0 | 0.42 | 2.0 to 3.0 |
| 6 | 15 | 5 | 0 | 0.35 | 2.0 to 3.0 |
| 7 | 15 | 10 | 5 | 0.35 | 2.0 to 3.0 |

*approximate
**typical range; depends on specific sources of stated nutrients

Cubed cotton gin waste is simpler to apply than other soil conditioners, such as oak leaf mulch, peat moss and spagum moss. Since it is cubed, it eliminates the problem caused when soil conditioner blows away. Moreover, it is more easily mixed in with the soil. Cubed cotton gin waste conditioner is preferably applied to the soil at a rate of about 100 pounds per 500 square feet and then spaded or rotary-tilled under the surface.

The cubed cotton gin waste absorbs a volume of water which is three times greater than its dry volume. Once under the soil the cubed waste absorbs water from the soil surface and swells. It thus results in a subsurface mulch which stores and inhibits the evaporation of an amount of water which is three times its dry volume. Moreover, the cubed waste, which is weed- and disease-free, is easy to store, handle and apply.

Exemplary embodiments of the present invention follow. The examples are presented solely for illustrative purposes and in no way limit the nature or scope of the invention.

EXAMPLE

Blow cotton gin waste (burrs, leaves, twigs, sand and dust) through a 42-inch tommy-type cyclone to blow out and separate the bulk of the sand and dust from the other ingredients (cgw). Auger the cgw into a rotary-type, 150 horsepower model VEE-ESS 1436, hammer tional means) to feed (when operative) a particular additament at an adjustable rate into the steamed cgw which is permitted to fall freely through the drop line.

a. For one batch (at a rate of 160 pounds per minute) 0.64 pound per minute of ammonium sulfate is augered into the freely-falling steamed cgw.

b. For another such batch 0.8 pound per minute of ammonium nitrate is augered into the freely-falling steamed cgw.

c. For a third such batch 0.56 pound per minute of ammonium nitrate, 0.21 pound per minute of ammonium phosphate and 0.21 pound per minute of potassium chloride are augered into the freely-falling steamed cgw.

d. For a fourth such batch 0.64 pound per minute of ammonium sulfate, 0.27 pound per minute of ammonium phosphate and 0.27 pound per minute of potassium chloride are augered into the freely-falling steamed cgw.

e. For a fifth such batch 0.67 pound per minute of ammonium nitrate is augered into the freely-falling steamed cgw.

f. For a sixth such batch 0.56 pound per minute of ammonium sulfate and 0.21 pound per minute of ammonium phosphate are augered into the freely-falling steamed cgw.

g. For a seventh such batch 0.56 pound per minute of ammonium sulfate, 0.21 pound per minute of ammonium phosphate and 0.21 pound per minute of potassium chloride are augered into the freely-falling steamed cgw.

The speed of each individual auger controls the rate of feed of the particular additament added to the steamed cgw.

Rather than having the individual nutrient sources separately augered into the steamed cgw, such sources are alternatively premixed in the desired proportions and the resulting premix is thus augered into the freely-falling steamed cgw as a single additament.

Charge each of the resulting batches separately into a 200 horsepower three-eighths-inch cubing machine (manufactured by Landers Manufacturing Company of Fort Worth, Tex.), wherein it is pressed through a cylindrically-shaped die. [Each cylindrical port of the die has a diameter of about ⅜ inch through which the steamed waste is extruded at a pressure in excess of about 30,000 pounds per square inch (psi) and at a temperature in excess of 200° F.]

Convey each of the thus-extruded batches individually to a cooling chamber and cool it therein to about 80° F before further conveying it to storage and/or packaging. Alternatively, cool the pellets by circulating air around and between them while conveying them to a storage area. Bag the cooled pellets in, e.g., 40-pound bags.

Thus-prepared cubed cgw is weed free, disease free, easy to handle and easy to store.

To use the pellets, broadcast about 100 pounds of the pelleted soil conditioner evenly over each 500 square feet of ground. Rototill or turn the pellets under the soil. [This last step is not essential; the pellets can be left on the surface and used in that manner.]

The preceding description of the present invention is susceptible to various modifications, changes and adaptations, as is readily apparent to those skilled in the art.

What is claimed is:

1. A process which comprises admixing with soil an amount effective to condition the soil of highly-compressed, dusted, ground and steamed cotton-gin-waste pellets.

2. A process according to claim 1 which comprises spading the pellets into or rotary-tilling them under the surface of soil at the rate of 100 pounds of pellets per 500 square feet of soil.

3. A process according to claim 1 wherein the pellets consist essentially of cubed cotton gin waste.

4. A process according to claim 1 wherein the pellets comprise an admixture of cotton gin waste and fertilizer.

5. A process according to claim 1 wherein the pellets comprise an admixture of cotton gin waste, fertilizer and soil adjuvant.

6. Pelletized soil conditioner, each pellet of which comprises an admixture of a) ground and steamed cotton gin waste with b) at least one member selected from the group consisting of fertilizer and soil adjuvant, the soil conditioner being water absorptive, water retentive and virtually free from weed seeds and pathogens detrimental to woody or herbaceous dicotyledonous plants.

7. Cubed soil conditioner according to claim 6 which consists essentially of steamed cotton gin waste, fertilizer and soil adjuvant.

8. Cubed soil conditioner according to claim 6 which consists essentially of steamed cotton gin waste and fertilizer.

9. Pelletized soil conditioner according to claim 6 having from about 2 weight percent to about 4 weight percent of component B.

* * * * *